United States Patent [19]
Kimura

[11] Patent Number: 5,371,349
[45] Date of Patent: Dec. 6, 1994

[54] AIRTIGHT CONNECTION FOR PORTABLE DATA STORAGE DEVICE

[75] Inventor: Masatoshi Kimura, Itami City, Japan

[73] Assignee: Mitsubishi Denki Kabushiki Kaisha, Tokyo, Japan

[21] Appl. No.: 119,829

[22] Filed: Sep. 13, 1993

Related U.S. Application Data

[63] Continuation of Ser. No. 685,272, Apr. 15, 1991, abandoned.

[30] Foreign Application Priority Data

Apr. 16, 1990 [JP] Japan .................................. 2-97624

[51] Int. Cl.⁵ ...................... G06K 19/077; H01M 2/10
[52] U.S. Cl. ..................... 235/492; 429/96; 429/185; 235/441
[58] Field of Search ............... 235/375, 487, 488, 492, 235/441; 277/165, 207 A, 207 R, 901; 429/96, 97, 98, 100, 185; 439/59, 62, 68, 137, 587, 278, 283

[56] References Cited

U.S. PATENT DOCUMENTS

| | | | |
|---|---|---|---|
| 3,006,139 | 10/1961 | Hug et al. | 429/100 X |
| 3,703,629 | 11/1972 | Hanbicki | 235/98 |
| 4,407,590 | 10/1983 | Ohno et al. | 429/98 X |
| 4,511,796 | 4/1985 | Aigo | 235/492 |
| 4,601,528 | 7/1986 | Spier | 439/138 |
| 4,705,339 | 11/1987 | Hayes et al. | 429/277 |
| 4,707,594 | 11/1987 | Roth | 235/488 |
| 4,714,432 | 12/1987 | Huggins | 439/271 |
| 4,842,966 | 6/1989 | Omori et al. | 429/96 |
| 4,868,074 | 9/1989 | Omori et al. | 429/98 |
| 5,016,086 | 5/1991 | Inoue et al. | 235/492 X |

FOREIGN PATENT DOCUMENTS

| | | | |
|---|---|---|---|
| 113399 | 7/1984 | European Pat. Off. | 429/185 |
| 0312067 | 4/1989 | European Pat. Off. | 235/486 |
| 2605149 | 4/1988 | France | 439/587 |
| 59-139480 | 8/1984 | Japan . | |
| 3-22281 | 1/1991 | Japan . | |

OTHER PUBLICATIONS

Hp41, HP41, 1980, p. 257.

Primary Examiner—Davis L. Willis
Assistant Examiner—Edward Sikorski
Attorney, Agent, or Firm—Leydig, Voit & Mayer

[57] ABSTRACT

A sealing member such as an O-ring, packing, or gasket is provided on the inner wall of an insertion hole of a terminal connector and/or on the outer surface of a portable data storage device which is inserted into the terminal connector so that the clearance between the portable data storage device and the insertion hole of the terminal connector is filled. An area from the sealing member inside the insertion hole to the innermost electrode section is made air-tight, and therefore no dirt, dust, etc. can enter. Metal panels may be provided on each of the obverse and reverse sides of the portable device to improve mechanical strength. In a portable data storage device equipped with a releasable battery holder, a sealing member is provided on the outer surface of the battery holder and/or on the inner wall of a battery holder housing section of the portable device so that the clearance between the battery holder and the housing section is filled. An area from the sealing member inside the housing section to the innermost electrode section therein is made air-tight, thereby preventing the entry of dirt, dust, etc.

9 Claims, 2 Drawing Sheets 5,371,349

AIRTIGHT CONNECTION FOR PORTABLE DATA STORAGE DEVICE

This application is a continuation of application Ser. No. 07/685,272, filed Apr. 15, 1991 now abandoned.

BACKGROUND OF THE INVENTION

1. Field of the Invention

The present invention relates to a card-type portable data storage device and a portable data storage device connection mechanism comprising this data portable storage device and a connector terminal to which this storage device is connected, and, in particular, to a dustproof and dripproof construction of said storage device.

2. Description of the Related Art

FIG. 6 is a cross-sectional view showing a conventional portable data storage device inserted into a terminal connector. FIG. 6 shows which a card-type portable data storage device 1 inserted into an insertion hole 5a of a terminal connector 5 disposed on the board 7 of a terminal. A plurality of female electrodes 2a are arrayed in the connector section 2 of the portable data storage device 1. The same number of male electrodes 6 are disposed inside the insertion hole 5a of the terminal connector 5, the male electrodes 6 being inserted into the female electrodes 2a of the portable data storage device 1 thereby making an electrical connection. In such a state in which the portable data storage device 1 is inserted into the terminal connector 5, there is inevitably a clearance between the above two, and dirt, dust, and the like are bound to enter through the clearance. The arrow symbol A in FIG. 6 indicates the route of the entry of dust, water, oil, corrosive gases, etc. from outside. There is a possibility that, in particular, water, oil, and corrosive gases will enter through the press-fit section for the male electrodes 6 on the terminal connector 5.

A current which flows through the electrode sections of the male electrodes 6 and of the female electrodes 2a is generally small, on the order of μA to mA in the case of a signal line. Therefore, if dust sticks, there is a danger that a defective contact will occur, causing data stored in the portable data storage device 1 to be destroyed. There is also a danger that adhesion of a corrosive gas or a liquid may corrode the electrode sections. Where the portable data storage device 1 has a battery for data backup, there is a possibility that dirt, dust, etc. will enter from the section between a battery holder for housing this battery (not shown) and the portable data storage device main body.

In the conventional contact-point portable data storage device 1 and the terminal connector 5 shown in FIG. 6, it is quite difficult to prevent the entry of dirt, dust, etc. into the terminal connector 5 when the portable data storage device 1 is inserted into the terminal connector 5. For this reason, there has been available a noncontact type portable data storage device which is not susceptible to influences from the environment of a place where it is used, for example, a device in which magnetic coupling is used. However, most of these devices read and write data by serial transmission. This serial transmission has a drawback in that its data transmission speed is slow. There is also a drawback in that the memory storage capacity of such a device is small. That is, in the present situation, no portable data storage device is available which is not easily susceptible to adverse environmental influences which transmits data at a high speed, and which has a large storage capacity.

In the conventional contact-point portable data storage device connection mechanism, it is impossible to prevent the entry of dirt, dust, corrosive gas, or liquid at a clearance space between a portable storage device and a terminal connector. Therefore, it cannot be used in stringent environmental conditions, and there arises a problem in that the field of applications of the portable data storage device is limited.

SUMMARY OF THE INVENTION

The present invention has been devised to solve the above-mentioned problems. An object of a first embodiment of the invention is to produce a portable data storage device in which a clearance between a terminal connector and a portable data storage device is filled when the portable data storage device is inserted into the terminal connector so that an area including the electrode sections is made air-tight and therefore no dirt, dust, etc. can enter.

An object of a second embodiment of the invention is to produce a portable data storage device having a battery for produce data backup in which a clearance between the portable data storage device and a battery holder which is releasably provided is filled and therefore no dirt, dust, etc. can enter.

To this end, according to a first embodiment of the invention, there is provided a connection mechanism of a portable data storage device including a portable data storage device and a terminal connector into which the portable data storage device is inserted, comprising: a portable data storage device including a portable data storage device main body having outer surfaces and incorporating at least one electronic part, and an electrode section exposed to the outer surface of the main body; a terminal connector including an insertion hole to which the portable data storage device is inserted, the insertion hole having an inner wall, and an electrode section disposed on the inner wall of the insertion hole exposed at a position at which the electrode section can be connected to the electrode section of the data storage device when the portable data storage device is inserted into the insertion hole; and at least one sealing means filling a clearance between the outer surface of the portable data storage device and the inner wall of the insertion hole when the data storage device is inserted into the insertion hole, the sealing means being disposed around at least one of the outer surfaces and the inner wall in a plane substantially perpendicular to the insertion direction of the portable data storage device, closer to an entrance side than the electrode section where the inner wall of the insertion hole overlaps the outer surfaces of the portable data storage device whereby a volume the inside of the sealing means in the insertion hole of the terminal connector to the innermost electrode section is made air-tight.

In addition, the press-fit section for the electrode section of the terminal connector is coated with a protective coating material for preventing the entry of dirt or dust.

To this end, according to a second embodiment of the invention, there is provided a portable data storage device comprising: a portable data storage device main body having at least one electronic part incorporated therein and having outer surfaces; an electrode section exposed on the outer surface of the main body which makes an electrical connection of the electronic part with the exterior; a battery which serves as a power source for the electronic part; a battery holder holding the battery and having an outer surface; a battery holder housing section having an inner wall on the main body and releasably housing the battery holder; and at least one sealing means filling a clearance between the outer surface of the battery holder and the inner wall of the battery holder housing section when the battery holder is inserted into the housing section, the sealing means formed around at least one of the outer surfaces and the inner wall in a plane substantially perpendicular to the insertion direction of the battery holder closer to an entrance side than the battery at the portion where the inner wall of the battery holder housing section overlaps the outer surfaces of the battery holder whereby a volume inside of the sealing means in the holder housing section of the main body to the innermost electrode section is made air-tight.

Also, the present invention includes a combination of the first and second embodiments.

In the first embodiment, a sealing means provided on at least either the inner wall of an insertion hole of a terminal connector or the outer surface of the portable data storage device fills the clearance between the portable data storage device and the terminal connector when the portable data storage device is inserted into the terminal connector so as to make an area from the sealing means to the innermost electrode section inside the terminal connector air-tight, thus preventing the entry of dirt, dust, etc.

In the second embodiment, a sealing means provided on at least one of the outer surface of a battery holder and the inner wall of the battery housing section fills the clearance between the surface and wall in a state in which the battery holder is inserted into the housing section so as to make an area from the sealing means inside the battery housing section to the area where the battery is housed air-tight, thus preventing the entry of dirt, dust, etc.

Also, in a combination of the first and second embodiments, the area from the portion of each of the electrode sections of the terminal connector and of the portable data storage device to the interior of the data storage device, and further the entire area covering the portion where the battery is housed, is made air-tight.

DESCRIPTION OF THE PREFERRED EMBODIMENTS

Figure 1:
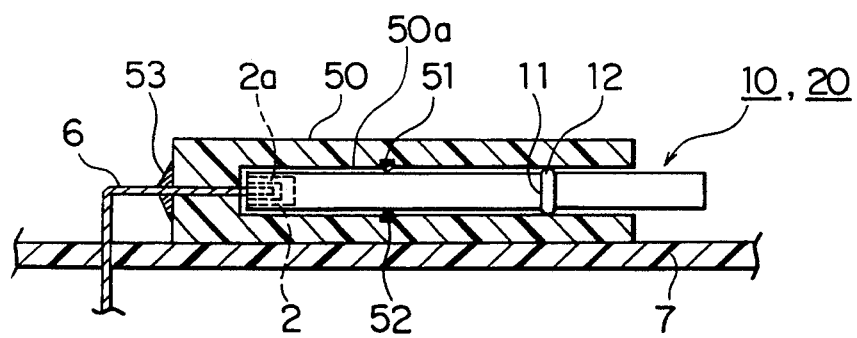
FIG. 1 is a cross-sectional view showing an embodiment of the connection mechanism of a portable data storage device of a first embodiment of the invention.
Figure 6:
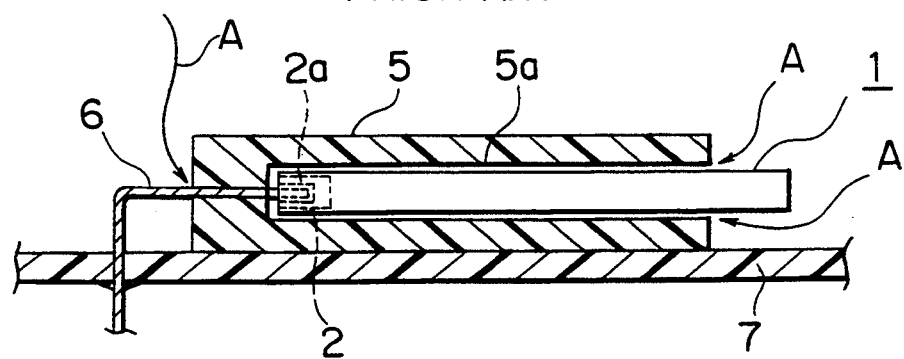
FIG. 6 is a cross-sectional view showing the connection mechanism of a conventional portable data storage device.

An embodiment of the present invention will now be explained hereinbelow with reference to the accompanying drawings. FIG. 1 shows an embodiment of the connection mechanism of a portable data storage device of the first embodiment of the invention. Parts in FIG. 1 designated by the same reference numerals as those of the prior art shown in FIG. 6 indicate the same or corresponding parts. Housed in a portable storage device 10 or 20 is a printed board on which a plurality of electronic parts for data storage are mounted, as shown in FIGS. 2C and 3C. Reading or writing data from or to these electronic parts is performed via a plurality of female electrodes 2a disposed in a connector section 2. When the portable data storage device 10 or 20 is inserted into the insertion hole 50a of a terminal connector 50 for reading or writing data, the plurality of female electrodes 2a of the portable data storage device 10 or 20 is connected to the plurality of male electrodes 6 disposed inside the insertion hole 50a. Reading or writing data is performed via these electrodes. A groove 51 is formed around an inner wall of the insertion hole 50a in a plane substantially perpendicular to the insertion direction of the portable data storage device. The sealing member 52 is inserted into this groove 51 around the inner wall of the insertion hole 50a so that it does not slip out of place, and it is, for example, fixed by a bonding agent or the like. A groove 11 is formed around outer surfaces of the portable data storage device 10 or 20 in a plane substantially perpendicular to the insertion direction of the portable data storage device is provided where the terminal connector overlaps the portable data storage device on the outer surface of the portable data storage device 10 or 20. A sealing member 12 is inserted into the groove 11 around the outer surface of the portable data storage device 10 or 20, and it is, for example, fixed by a bonding agent or the like. The groove 11 and the sealing member 12 are provided where the inner wall of the insertion hole 50a overlaps the outer surfaces of the portable data storage device when the data storage device is inserted into the terminal connector. In the present invention, the sealing member and the groove for fixing this member need only be provided on either the insertion hole 50a of the terminal connector 50 or the portable data storage device 10 or 20. When the storage device 10 or 20 is inserted into the insertion hole 50a, a part of sealing member 12 and a part of sealing member 52 project respectively from grooves 11 and 51 and come into abutment with the inner wall of the insertion hole and the outer surface of the data storage device respectively. Accordingly the clearance between the inner wall of the insertion hole 50a and the outer surface of the data storage device is filled. As a result, the portion from the sealing member to the innermost part inside the insertion hole 50a is air-tight thus preventing the entry of dirt, dust, water, oil, corrosive gases, etc. from outside. For sealing members 12 and 52, for example, O-rings, packing, and a gasket formed of silicone rubber or natural rubber are used. In addition, the press-fit portion of the terminal connector 50 where the male electrodes 6 are press-fitted may be coated with a protective coating material 53 made of silicone type or epoxy type resin in order to prevent the entry of dirt, dust, water, oil, corrosive gases, etc.

Figure 2A:
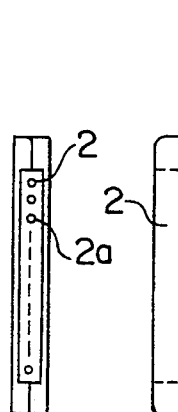
FIGS. 2A to 2C are each views showing an embodiment in which all the armoring materials of the portable data storage device of a first embodiment of the invention are made of plastic.
Figure 2B:
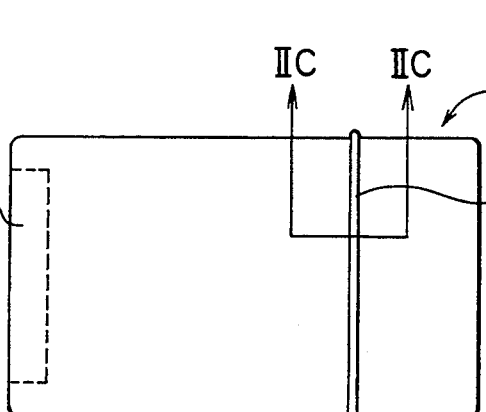
Figure 2C:
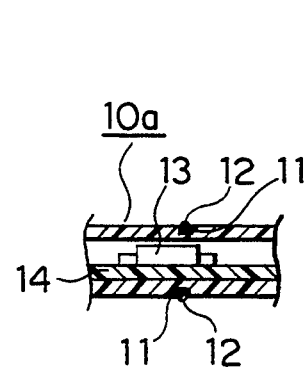
Figure 3A:
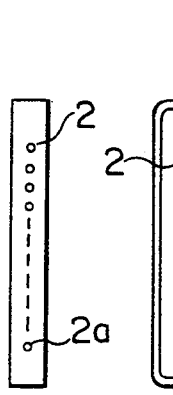
FIGS. 3A to 3C are each views showing an embodiment in which plastic and a metal panel are used for the armoring materials of a portable data storage device of the first embodiment of the invention.
Figure 3B:
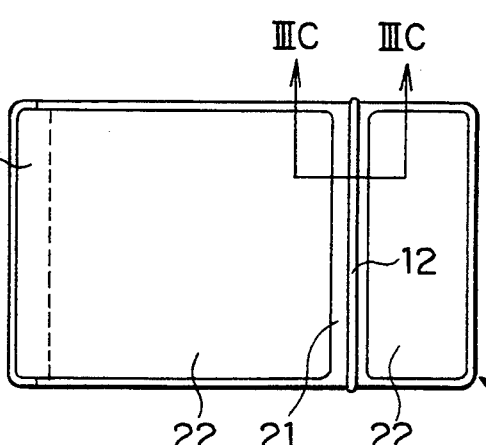
Figure 3C:
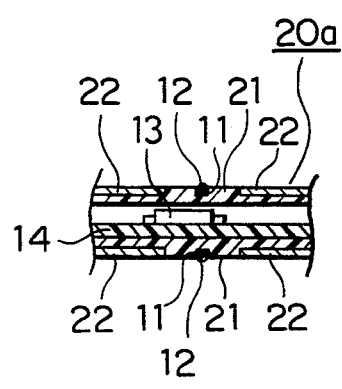

FIGS. 2A to 2C each show an embodiment of the present invention in which all of the case of the portable data storage device of the first embodiment of the invention is made of plastic. FIG. 2A is a side view; FIG. 2B is a front view; and FIG. 2C is a cross-sectional view taken along the line IIC—IIC in FIG. 2B. In the portable data storage device 10, generally, a printed circuit board 14 on which electronic parts 13 are mounted is housed in the portable data storage device main body 10a. In addition, the connector section 2 provided with a plurality of female electrodes 2a is disposed on one end of this main body 10a. Each of these female electrodes 2a is electrically connected to one of the electronic parts 13. The groove 11 is formed around the outer surface of the main body 10a, and the sealing member 12 is fitted in this groove 11. FIGS. 3A to 3C each show an embodiment of the present invention in which plastic and a metal panel are used as the case of the portable data storage device of the present invention. FIG. 3A is a side view; FIG. 3B is a front view; and FIG. 3C is a cross-sectional view taken along the line IIIC—IIIC in FIG. 3B. In this type of conventional portable data storage device, a metal panel 22 extending over substantially the entire surface of a main surface of the portable data storage device main body is disposed on both the obverse and reverse surfaces. This metal panel improves mechanical strength and keeps out noise from outside. In the portable data storage device 20 of the present invention shown in FIGS. 3A to 3C, a plastic section 21 is formed on a part of the metal panel 22 on both the obverse and reverse sides of the portable data storage device main body 20a. The groove 11 is formed on the circumference of the main body 20a through the plastic section 21 in a plane substantially perpendicular to the insertion direction of the storage device. The sealing member 12 is provided along this groove 11. The groove 51 and the sealing member 52 of the insertion hole 50a may be formed in the same manner as the above description with respect to FIG. 1. A detailed illustration thereof is omitted. Although it is normally expected that dirt, dust, corrosive gases, etc. will enter through the press-fit section for the male electrodes 6 on the outer surface of the terminal connector 50, this is prevented by a protective coating material 53 shown in FIG. 1.

Figure 4A:
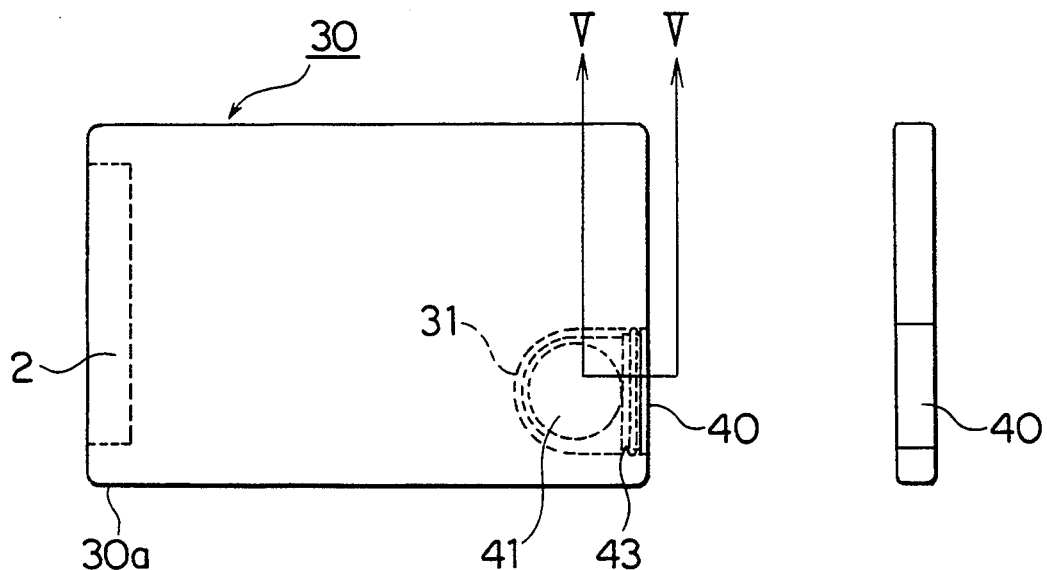
FIGS. 4A and 4B are each views showing a embodiment of a portable data storage device of the second embodiment of the invention.
Figure 4B:
Figure 5A:
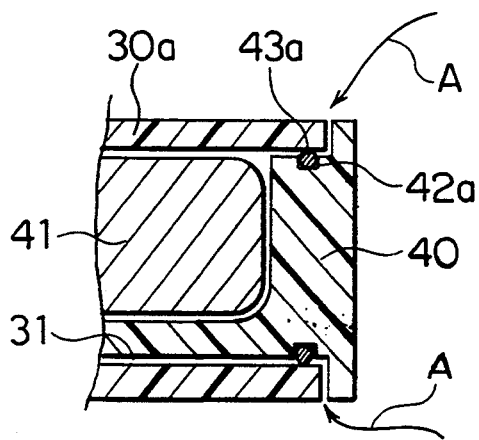
FIGS. 5A and 5B are each cross-sectional views taken along the line V—V in FIG. 4.
Figure 5B:
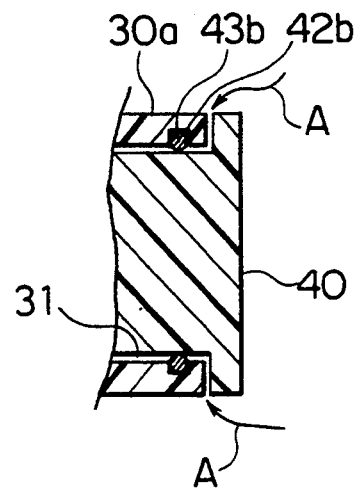

FIGS. 4A and 4B each show a portable data storage device according to the second embodiment of the invention. FIG. 4A is a front view of the portable data storage device, and FIG. 4B is a side view in which the portable data storage device shown in FIG. 4A is seen from the right side thereof. Housed in a portable data storage device 30 are electronic parts for data storage (see Figs. 2C and 3C), namely a volatile memory, such as a SRAM, in which data must be retained. Accordingly, a battery holder 40 is provided with a battery 41 for data backup. The battery holder 40 is releasably provided in a battery holder housing section 31 inside the portable data storage device main body 30a so that the battery 41 can be replaced. A sealing member 43 is provided around the inner wall of the housing section 31 and/or around the outer surface of the holder 40 at the portion where the battery holder 40 overlaps the battery holder housing section 31 when the battery holder 40 is inserted into the battery holder housing section 31. FIGS. 5A and 5B are cross-sectional views showing states in which sealing members 43a and 43b are provided on the battery holder 40 and the battery holder housing section 31, respectively. Grooves 42a and 42b are formed around the outer surfaces of the battery holder 40 and the inner wall of the housing section 31 in respective plane substantially perpendicular to the insertion direction of the battery holder 40, respectively. The sealing members 43a and 43b are inserted into these grooves 42a and 42b around the holder and the inner wall of the housing section, respectively, and fixed by a bonding agent or the like so that the will not slip out of place. The sealing members need only be provided on one side of either the battery holder housing section 31 or the battery holder 40. A part of the sealing members 43a and 43b projects from the grooves 42a and 42b, respectively. Such projections come into abutment with the inner wall of the housing section and the outer surfaces of the holder when the holder 40 is inserted into the housing section 31, so that the clearance between the inner wall of the housing section 31 and the outer surface of the battery holder 40 is filled. As a result, the portion from the sealing member to the innermost part inside the holder housing section 31 is made air-tight, thereby preventing the entry of dirt, dust, corrosive gas, liquid, etc. from outside. For the sealing member 43, for example, O-rings, packings, and a gasket formed of silicone rubber or natural rubber are used in the same manner as for the sealing member of the first invention.

Further, the first embodiment of the invention may be combined with the second embodiment of the invention. That is, a sealing member may be provided between the insertion hole of a terminal connector and a portable data storage device, and between the battery holder housing section provided in the portable data storage device main body and the battery holder. Therefore, dirt, dust, corrosive gas, liquid, etc. can be totally prevented from entering from outside.

The portable data storage device and connection mechanism thereof of the present invention are effective when these are used, in a place having a severe natural environment, such as the polar regions, or in a factory surrounded by oil or corrosive gas.

In the above-described first embodiment of the invention, one sealing member provided on the same side of the inner wall of a terminal connector or, of the outer surface of a portable data storage device, is used. However, a plurality of sealing members may be provided on the same side. The same applies to the second embodiment of the invention. A plurality of sealing members may be provided on the same side of the battery holder and of the battery holder housing section.

In each of the embodiments of the invention, a groove is provided on the surface on which a sealing member is disposed and the sealing member is inserted thereinto. However, a sealing member may be directly disposed on the surface without forming a groove and, if necessary, may be fixed, for example, by a bonding agent or the like.

Regarding the first embodiment of the invention, for a portable data storage device, one in which an electrode section, i.e., a connector section, is provided on the side of the insertion direction is shown in the above-mentioned embodiment. However, the first embodiment of the invention may be adapted to a portable data storage device in which the electrode section is provided on the main surface of the portable data storage device main body at an insertion side edge. Accordingly, the sealing member should be provided closer to the entrance side than the electrode section of the insertion hole of the terminal connector. Regarding the second embodiment of the invention, the sealing member should be provided closer to the entrance side than the battery inside the battery holder housing section.

In the first embodiment of the invention, the area from the sealing member to the innermost electrode section in the terminal connector is made air-tight. Therefore, dirt, dust, or corrosive gas can be prevented from entering, and, in particular, a defective contact and corrosion of the electrode section can be prevented. As a result, it is possible to treat the portable data storage device equally with a noncontact type portable data storage device. It can be used outdoors—thus, the field of applications thereof becomes wider. Also, the press-fit section for the electrode section on the exterior of the terminal connector may be coated with a protective coating material for preventing the entry of dirt, dust, etc. Thus, an air-tight state with higher reliability can be obtained.

In the second embodiment of the invention, the area from the sealing member to the innermost battery connection section in the battery holder housing section is made air-tight. Therefore, dirt, dust, water, oil, or corrosive gas can be prevented from entering. A defective contact and corrosion of the portion where the battery is connected and further of the electrical circuits on the printed circuit board in the portable data storage device can be prevented.

Also, the first embodiment of the invention may be combined with the second invention to totally prevent the entry of dirt, dust, etc. As a result, when the portable data storage device is inserted into the terminal connector, the part from the electrode sections for the connection with the terminal to the printed circuit board in the storage device and further the battery holder part, that is, the whole electrical circuit portion, can be maintained in an air-tight state. Thus, an advantage can be obtained in that the field of applications of the portable data storage device can be made wider.

What is claimed is:

1. A connection mechanism for a portable data storage device comprising:
   a portable data storage device including a portable data storage device main body having outer surfaces enclosing at least one electronic part and an electrode section exposed at one of the outer surfaces of said main body, said main body including a plastic base having, as outer surfaces of said main body, opposed obverse and reverse sides, two spaced apart metal panels disposed on the obverse side, and two spaced apart metal panels disposed on the reverse side, intermediate portions of the plastic base being exposed between the spaced apart metal panels on the obverse and reverse sides;
   a terminal connector including an insertion hole into which said portable data storage device is insertable, the insertion hole having an inner wall and an electrode section disposed on the inner wall of the insertion hole for connection to the electrode section of said portable data storage device when said portable data storage device is inserted into the insertion hole; and
   at least one sealing means for filling a clearance between the outer surfaces of said portable data storage device and the inner wall of the insertion hole when the portable data storage device is inserted into the insertion hole, said sealing means including a circumferential groove in the plastic base, including in the intermediate portions of the plastic base, in a plane substantially perpendicular to an insertion direction of the portable data storage device into the insertion hole and a sealing member disposed in the groove with part of said sealing member projecting from the groove for filling the clearance between the outer surfaces of said portable data storage device and the inner wall of the insertion hole whereby a volume from said sealing means in the insertion hole of said terminal connector to the electrode section on the inner wall is made airtight when said portable data storage device is inserted in said terminal connector.

2. The connection mechanism of claim 1 wherein said sealing member is fixed in the groove with a bonding agent.

3. The connection mechanism of claim 1 wherein said sealing member is one of an O ring, packing, and a rubber gasket.

4. The connection mechanism of claim 1 wherein the electrode section of said terminal connector is press-fitted from the exterior of the terminal connector to reach the inside of the insertion hole and the press-fit section of the electrode section is coated with a protective material to improve the air-tightness of the volume including the electrode section.

5. A portable data storage device comprising:
   a portable data device main body having at least one electronic part incorporated therein and having outer surfaces;
   an electrode section exposed on the outer surface of said main body for electrically connecting said electronic part to another element;
   a battery which serves as a power source for said electronic part;
   a battery holder holding said battery and having an outer surface;
   a battery holder housing section having an inner wall on said main body, releasably housing said battery holder; and
   at least one sealing means for filling a clearance between the outer surface of said battery holder and the inner wall of said battery holder housing section when said battery holder is inserted into said battery holder housing section, said sealing means being disposed around at least one of the outer surface and the inner wall in a plane substantially perpendicular to an insertion direction of said battery holder into said battery holder housing section whereby a volume inside of said battery holder housing section from said sealing means inward is air-tight when said battery holder is inserted into said battery holder housing section.

6. The portable data storage device of claim 5 wherein said sealing means includes a sealing member for filling the clearance between the outer surface of said battery holder and the inner wall of said battery holder housing section, said sealing member being fixed with a bonding agent and being disposed on one of the inner wall of said battery holder housing section and the outer surface of said battery holder in a plane substantially perpendicular to the insertion direction of said battery holder into said battery holder housing section.

7. The portable data storage device of claim 5 wherein said sealing means includes a groove in one of the inner surface of said battery holder housing section and the outer surface of said battery holder in a plane substantially perpendicular to the insertion direction of said battery holder into said battery holder housing section and a sealing member in the groove, a part of said sealing member projecting from the groove for filling the clearance between the outer surface of said battery holder and the inner wall of said battery holder housing section.

8. The portable data storage device of claim 7 wherein said sealing member is one of an O ring, packing, and a rubber gasket.

9. A connection mechanism for a portable data storage device comprising:
- a portable data storage device including a portable data device main body having at least one electronic part incorporated therein and having outer surfaces;
- an electrode section exposed on the outer surface of said main body for electrically connecting said electronic part to another element;
- a battery which serves as a power source for said electronic part:
- a battery holder holding said battery and having an outer surface:
- a battery holder housing section having an inner wall on said main body, releasably housing said battery holder;
- at least one sealing means for filling a clearance between the outer surface of said battery holder and the inner wall of said battery holder housing section when said battery holder is inserted into said battery holder housing section, said sealing means being disposed around at least one of the outer surface and the inner wall in a plane substantially perpendicular to an insertion direction of said battery holder into said battery holder housing section, whereby a volume inside of said battery holder housing section from said sealing means inward is air-tight when said battery holder is inserted into said battery holder housing section;
- a terminal connector including an insertion hole into which said portable data storage device is insertable, the insertion hole having an inner wall, an electrode section disposed on the inner wall of the insertion hole by press-fitting and exposed at a position at which the electrode section of said terminal connector can be connected to the electrode section of said portable data storage device when said portable data storage device is inserted into the insertion hole, and a protective coating material filling the clearance of the press-fit section of said electrode section; and
- at least one sealing means for filling a clearance between the outer surfaces of said portable data storage device and the inner wall of the insertion hole when the portable data storage device is inserted into the insertion hole, said sealing means being disposed on at least one of the outer surfaces of said portable data storage device and the inner wall of said terminal connector in a plane substantially perpendicular to the insertion direction of said portable data storage device into the insertion hole, whereby a volume from said sealing means in the insertion hole of said terminal connector to the electrode section of said terminal connector is made air-tight when said portable data storage device is inserted in said terminal connector.

* * * * *